(12) United States Patent
Miyazawa et al.

(10) Patent No.: US 7,558,868 B2
(45) Date of Patent: Jul. 7, 2009

(54) INFORMATION PROCESSING DEVICE AND METHOD, RECORDING MEDIUM, AND PROGRAM

(75) Inventors: Satoshi Miyazawa, Kanagawa (JP); Shinji Minamihama, Kanagawa (JP)

(73) Assignee: Sony Corporation, Tokyo (JP)

( * ) Notice: Subject to any disclaimer, the term of this patent is extended or adjusted under 35 U.S.C. 154(b) by 740 days.

(21) Appl. No.: 10/523,173

(22) PCT Filed: Jul. 9, 2003

(86) PCT No.: PCT/JP03/08692

§ 371 (c)(1),
(2), (4) Date: Jan. 28, 2005

(87) PCT Pub. No.: WO2004/012402

PCT Pub. Date: Feb. 5, 2004

(65) Prior Publication Data

US 2005/0243625 A1    Nov. 3, 2005

(30) Foreign Application Priority Data

Jul. 30, 2002    (JP) .............................. 2002-221130

(51) Int. Cl.
*G06F 15/16* (2006.01)
*H04J 3/06* (2006.01)
*H04L 7/00* (2006.01)

(52) U.S. Cl. ...................... 709/231; 709/232; 370/516; 370/517; 375/356; 375/363; 375/371

(58) Field of Classification Search ................. 375/355, 375/356, 357; 725/118; 380/210; 370/503, 370/509, 516, 517, 528, 535, 538; 348/423.1
See application file for complete search history.

(56) References Cited

U.S. PATENT DOCUMENTS

| 5,790,543 | A | * | 8/1998 | Cloutier ...................... 370/252 |
| 5,966,387 | A | * | 10/1999 | Cloutier ...................... 370/516 |
| 6,175,385 | B1 | * | 1/2001 | Kohiyama et al. .......... 348/537 |
| 6,212,206 | B1 | | 4/2001 | Ketcham |

FOREIGN PATENT DOCUMENTS

| EP | 0 987 894 | | 3/2000 |
| EP | 1 143 671 | | 10/2001 |
| JP | 363262942 A | * | 10/1988 |
| JP | 2002 185498 | | 6/2002 |

* cited by examiner

*Primary Examiner*—Ashok B Patel
(74) *Attorney, Agent, or Firm*—Frommer Lawrence & Haug LLP; William S. Frommer; Thomas F. Presson

(57) ABSTRACT

An information processing apparatus and method, a recording medium, and a program for removing jitter and reducing the delay of the information processing system. A substantial error is produced between accumulated value of intervals of reception time of the packets and accumulated value of time stamps of these packets. For each number of transport stream packets on which this substantial error provides one clock, a time equivalent to one clock is added to the subsequent time stamps of the transport stream packets or this time is subtracted therefrom to adjust time stamp, thereby correcting the deviation in time from reception time of the transport stream packets.

18 Claims, 11 Drawing Sheets

F I G. 7
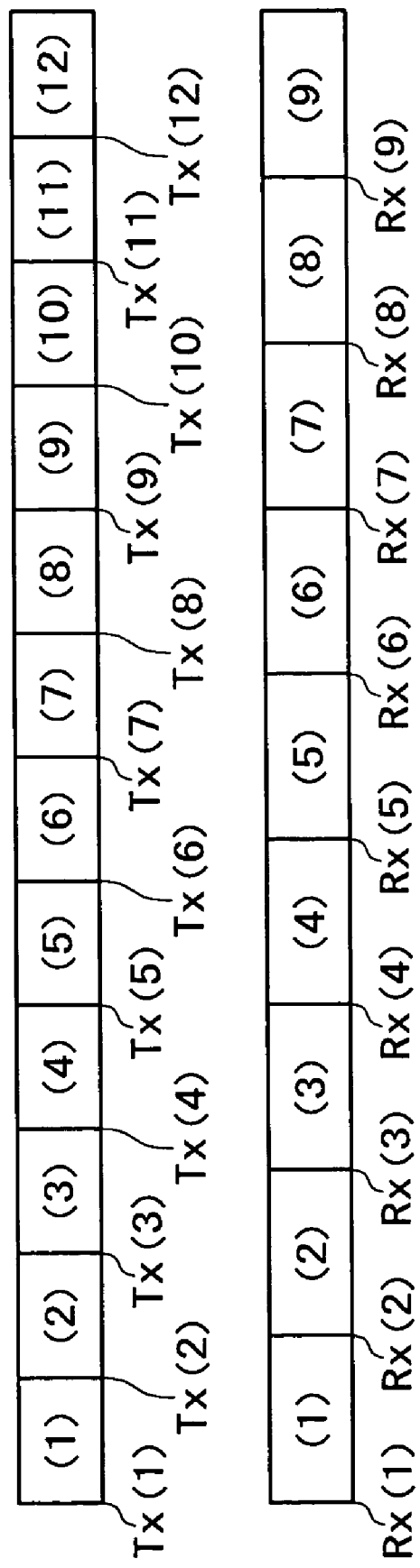

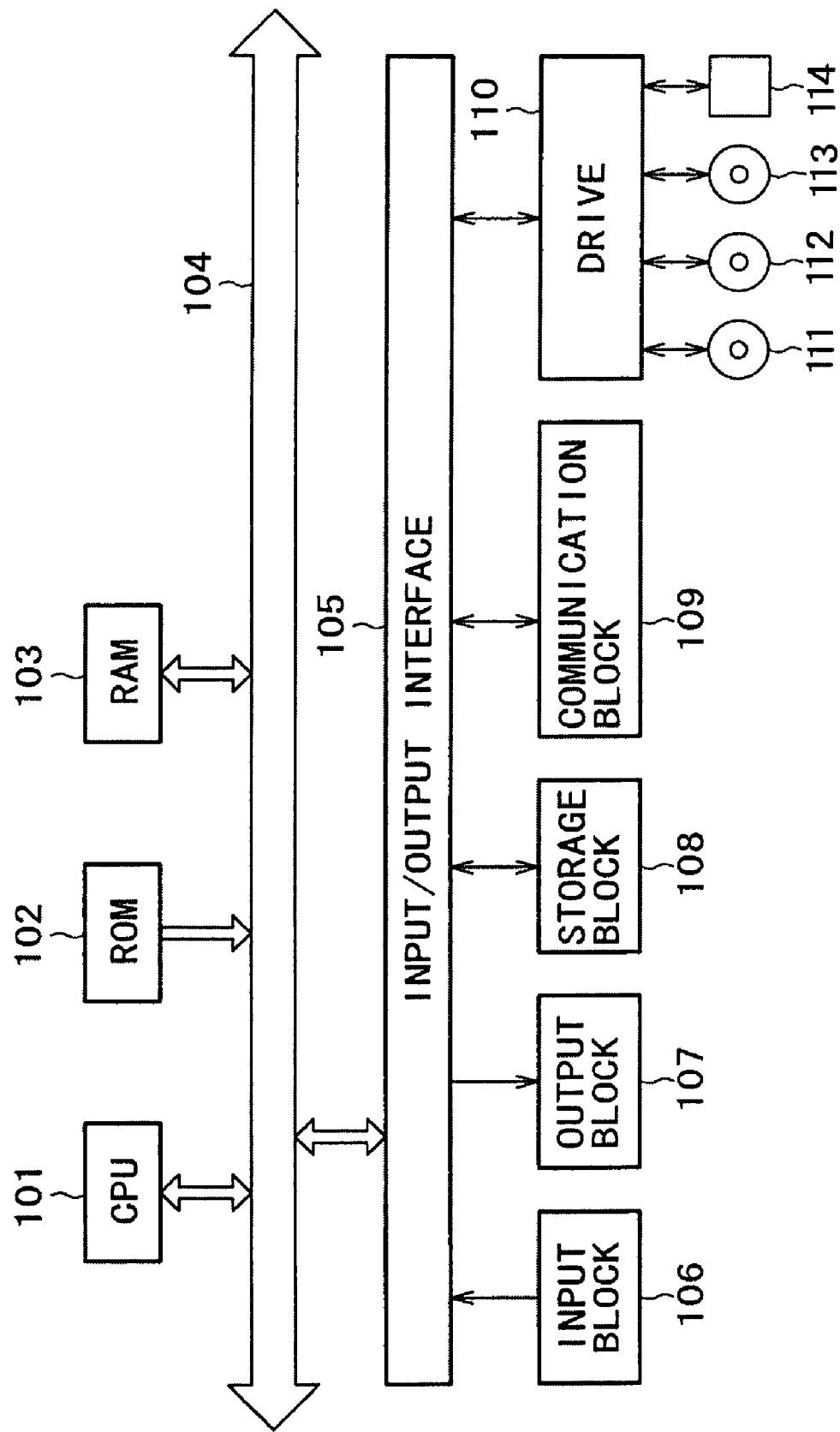

mission is managed almost to zero. However, with ATM

INFORMATION PROCESSING DEVICE AND METHOD, RECORDING MEDIUM, AND PROGRAM

TECHNICAL FIELD

The present invention relates generally to an information processing Apparatus and method, a recording medium, and a program and, more particularly, to an information processing apparatus and method, a recording medium, and a program that are adapted to adjust and correct clock errors from the time stamp attached to stream data, the errors being caused when the stream data is received via a network.

BACKGROUND ART

The continuing growth of the network technologies, such as the Internet and the IP (Internet Protocol), has been increasing the demands for the transmission/reception of stream data via IP-based networks.

The stream data transmission/reception processing that is executed through networks is applied to the transfer of live or recorded remote learning images and the television broadcasting to personal computers through IP network, for example. Such stream data transmission/reception processing is generally executed through the Internet.

In the communication through the Internet, TCP/IP (Transmission Control Protocol/Internet Protocol) for example, a communication procedure called "pull mode", which is designed to optimize data transfer, is used. In the pull mode, a sender device and a receiver device communicate each other. If an overflow approaches in buffering data from the sender device by the receiver device, the sender device slows down the transmission speed. If an underflow approaches on the receiver device, the sender device raises the communication speed, thereby maintaining the status necessary for buffering.

Therefore, in this configuration, even if a delay occurs during transfer of stream data in the communication processing between terminals interconnected on a point-to-point basis through the Internet, no fault occurs in the reproduction of stream data between the receiver device and the sender device.

However, because digital A/V broadcast services for example aim at the realtime distribution of stream data, "push mode" communication based on a high-capacity transmission channel and a return channel of requisite minimum capacity (or no return channel) is required. The push mode as used herein denotes a communication mode in which the sender device transmits data to the receiver device in a unilateral way.

Consequently, between the sender device and the receiver device, a jitter occurs between the reproduction time recorded to the time stamp necessary for the reproduction of stream data and the reception time at which the stream data is actually received. As a result, this jitter causes buffer overflow or buffer underflow, which disables the decoding of stream data by a normal decoder.

The sender device and the receiver device have clocks necessary for their operations. Generally, the receiver device (a client computer for example) is not guaranteed for its clock accuracy, so that a mismatch may occur between the reproduction time included in the stream data encoded by the sender device and the reception time at which this stream data is received by the receiver device, thereby making the receiver device unable to correctly decode the stream data.

With a line, such as SONET/SDH (Synchronous Optical Network/Synchronous Digital Hierarchy), with clock synchronization managed, the jitter associated with data transmission is managed almost to zero. However, with ATM (Asynchronous Transfer Mode) with clock kept asynchronous, a cell jitter is generated by the cell exchange for the purpose of avoiding cell collisions. This cell jitter is held in Japan to equal to or less than 1.5 ms and 2 to 3 ms internationally. With the jitters of these levels, PLL (Phase Locked Loop) for example normally employed by the MPEG (Moving Picture Experts Group) decoder may be schemed so as to correct jitters equal to or less than 500 ns specified in MPEG, thereby absorbing line jitters.

However, in the IP-based data transfer, heavy jitters are caused by the LAN (Local Area Network) switch and the IP router connecting the backbone to its terminal devices. As the number of LAN switches and the IP routes increases (or as the number of hops increases), jitters become heavier.

In consideration of these problems, the performance of devices typified by the LAN switch have been enhanced, resulting in the high-speed switching by hardware. However, if a packet collision occurs from a plurality of port inputs, the time in which packets are temporarily stored on a first-in first-out basis causes a jitter.

In addition, if switching includes software processing, the time spent for this processing is not constant, thereby increasing jitters. Consequently, in the case of the realtime transfer of stream data of low delay for example, it is necessary to use lines that are managed to a certain degree. However, because actual jitters are about 10 ms to 1 second, the conventional method based on PLL cannot correct jitters, making it impossible for the receiver device to reproduce the clock of the sender device that encodes stream data. This consequently presents a problem that the receiver device cannot correctly reproduce stream data.

DISCLOSURE OF INVENTION

It is therefore an object of the present invention to reproduce stream data more correctly on the receiver device by correcting the clock used by the sender device when encoding the stream data that is transmitted through a network.

In carrying out the invention and according to one aspect thereof, a first information processing apparatus includes first extraction means for extracting a reproduction time from stream data, second extraction means for extracting a reception time of the stream data, computation means for computing a difference between the reception time and the reproduction time, and adjustment means for adjusting a reproduction time on the basis of the difference.

In carrying out the invention and according to a another aspect thereof, a second information processing apparatus includes first extraction means for extracting an interval of reproduction time between packets of stream data, second extraction means for extracting an interval of reception time between packets of the stream data, computation means for computing a difference between the interval of reproduction time and the interval of reception time, and adjustment means for adjusting a reproduction time on the basis of the difference.

The above-mentioned reproduction time is a time stamp.

The above-mentioned information processing apparatus further includes first accumulation means for accumulating intervals of reproduction time between a predetermined number of consecutive packets of the stream data to obtain a first time, and second accumulation means for accumulating intervals of reception time between the predetermined number of consecutive packets of the stream data to obtain a second time. The computation means computes a difference between the first time and the second time.

The above-mentioned information processing apparatus, still further includes smoothing means for smoothing the difference between the first time and the second time.

The above-mentioned adjustment means adjusts reproduction time information by adding a time equivalent to one clock to the reproduction time or subtracting the time from the reproduction time for each number of packets with which the difference between the first time and the second time smoothed by the smoothing means provides a deviation equivalent to one clock.

In carrying out the invention and according to still another aspect thereof, a first information processing method includes the steps of extracting a reproduction time from stream data, extracting a reception time of the stream data, computing a difference between the reception time and the reproduction time, and adjusting a reproduction time on the basis of the difference.

In carrying out the invention and according to yet another aspect thereof, a second information processing method includes the steps of extracting an interval of reproduction time between packets of stream data, extracting an interval of reception time between packets of the stream data, computing a difference between the interval of reproduction time and the interval of reception time, and adjusting a reproduction time on the basis of the difference.

The above-mentioned reproduction time is a time stamp.

The above-mentioned information processing method further includes the steps of accumulating intervals of reproduction time between a predetermined number of consecutive packets of the stream data to obtain a first time; and accumulating intervals of reception time between the predetermined number of consecutive packets of the stream data to obtain a second time. The computation step computes a difference between the first time and the second time.

The above-mentioned information processing method still further includes the step of smoothing the difference between the first time and the second time.

The above-mentioned adjustment step adjusts reproduction time information by adding a time equivalent to one clock to the reproduction time or subtracting the time from the reproduction time for each number of packets with which the difference between the first time and the second time smoothed by the smoothing step provides a deviation equivalent to one clock.

In carrying out the invention and according to a different aspect thereof, a first recording medium that is computer-readable and records a program executes the control steps of extracting a reproduction time from stream data, extracting a reception time of the stream data, computing a difference between the reception time and the reproduction time, and adjusting a reproduction time on the basis of the difference.

In carrying out the invention and according to a still different aspect thereof, a second recording medium that is computer-readable and records a program executes the control steps of extracting an interval of reproduction time between packets of stream data, extracting an interval of reception time between packets of the stream data, computing a difference between the interval of reproduction time and the interval of reception time, and adjusting a reproduction time on the basis of the difference.

The above-mentioned reproduction time is a time stamp.

In the above-mentioned recording medium, the program further executes the control steps of accumulating intervals of reproduction time between a predetermined number of consecutive packets of the stream data to obtain a first time, and accumulating intervals of reception time between the predetermined number of consecutive packets of the stream data to obtain a second time. The computation step computes a difference between the first time and the second time.

In the above-mentioned recording medium, the program further includes the control step of smoothing the difference between the first time and the second time.

The above-mentioned adjustment step adjusts reproduction time information by adding a time equivalent to one clock to the reproduction time or subtracting the time from the reproduction time for each number of packets with which the difference between the first time and the second time smoothed by the smoothing step provides a deviation equivalent to one clock.

In carrying out the invention and according to a yet different aspect thereof, a first program makes a computer execute the control steps of extracting a reproduction time from stream data, extracting a reception time of the stream data, computing a difference between the reception time and the reproduction time, and adjusting a reproduction time on the basis of the difference.

In carrying out the invention and according to an alternate aspect thereof, a second program makes a computer execute the control steps of extracting an interval of reproduction time between packets of stream data, extracting an interval of reception time between packets of the stream data, computing a difference between the interval of reproduction time and the interval of reception time, and adjusting a reproduction time on the basis of the difference.

The above-mentioned reproduction time is a time stamp.

The above-mentioned program further makes a computer execute the control steps of accumulating intervals of reproduction time between a predetermined number of consecutive packets of the stream data to obtain a first time, and accumulating intervals of reception time between the predetermined number of consecutive packets of the stream data to obtain a second time. The computation step computes a difference between the first time and the second time.

The above-mentioned program further makes a computer execute the control step of smoothing the difference between the first time and the second time.

The above-mentioned adjustment step adjusts reproduction time information by adding a time equivalent to one clock to the reproduction time or subtracting the time from the reproduction time for each number of packets with which the difference between the first time and the second time smoothed by the smoothing step provides a deviation equivalent to one clock.

In the above-mentioned first information processing apparatus, method, and program, a reproduction time is extracted from-stream data, a reception time of stream data is extracted, a difference between the reception time and the reproduction time is computed, and the reproduction time is adjusted on the basis of the computed difference.

In the above-mentioned second information processing apparatus, method, and program, intervals of reproduction time between packets of stream data are extracted, intervals of reception time between packets of stream data are extracted, a difference between the intervals of reproduction time and the intervals of reception time is computed, and the reproduction time is adjusted on the basis of the computed difference.

BRIEF DESCRIPTION OF DRAWINGS

FIG. 7 is a schematic diagram illustrating a process of adjusting Tx interval of a TS packet;

FIG. 12 is a block diagram illustrating a medium.

BEST MODE FOR CARRYING OUT THE INVENTION

Figure 1:
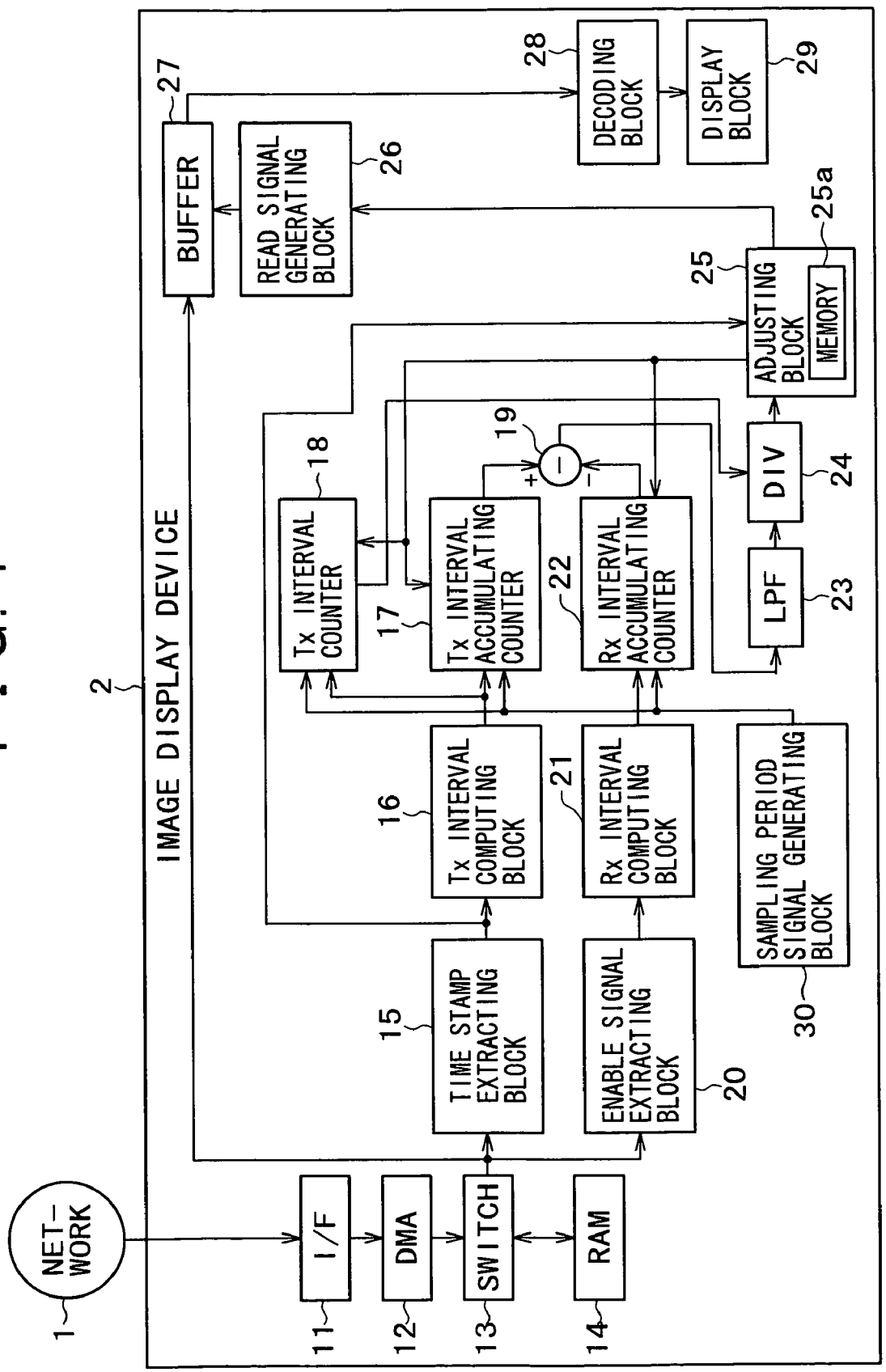
FIG. 1 is a block diagram illustrating an image display device to which the present invention is applied.

Now, referring to FIG. 1, there is shown a configuration of an image display device 2 practiced as first embodiment of the invention.

The image display device according to the invention receives stream data distributed via a network in real time. The stream data are a transport stream (hereafter also referred to as a TS) distributed as compressed by MPEG (Moving Picture Experts Group) 2 for example. The device displays the received TS on a display block 29.

An I/F (Interface) 11 receives a TS transmitted from a content server for example via a network 1 and outputs the received TS to a DMA (Direct Memory Access controller) 12. The DMA 12 appropriately controls a switch 13 to store the TS inputted from the I/F 11 into a RAM 14 or outputs the TS from the RAM 14 to a time stamp extracting block 15, an enable signal extracting block 20, and a buffer 27.

The time stamp extracting block 15 extracts time stamp Tx from each TS in units of TS packets and outputs the extracted time stamp Tx to a Tx interval computing block 16 and an adjusting block 25. The time stamp Tx as used herein corresponds to PCR (Program Clock Reference) of MPEG. This PCR is equivalent to the time stamp defined in RTP (Real Time Protocol), so that the PCR is generically referred to as a time stamp herein.

The Tx interval computing block 16 obtains intervals of time stamp Tx between consecutive TS packets from the information of time stamp Tx of inputted TS packets, namely, a time (hereafter referred to as a Tx interval) that provides a difference of the clock information of the time stamp Tx of continuous TS packets, and outputs the obtained the Tx intervals to an Tx interval accumulating counter 17 and a Tx interval counter 18.

The Tx interval accumulating counter 17 accumulates the Tx intervals sequentially inputted from the Tx interval computing block 16 for each TS packet and reads the accumulated value when a sampling period signal is inputted from a sampling period signal generating block 30, outputting the accumulated value to a subtracter 19.

The Tx interval counter 18 counts the number of Tx intervals outputted from the Tx interval computing block 16 and outputs the counted number of TX intervals to a DIV (divider) 24 when a sampling signal is inputted from the sampling period signal generating block 30.

The enable signal extracting block 20 extracts an enable signal from the TS supplied from the switch 13 and outputs the extracted signal to an Rx interval computing block 21.

On the basis of time Rx at which the TS packet was received, or the timing of the enable signal supplied from the enable signal extracting block 20, the Rx interval computing block 21 obtains an interval (hereafter referred to as an Rx interval) between the times at which consecutive TS packets were received and outputs the obtained interval to a Rx interval accumulating counter 22.

The Rx interval accumulating counter 22 accumulates Rx intervals sequentially inputted for each TS packet from the Rx interval computing block 21 and reads the accumulated value when a sampling period signal is inputted from the sampling period signal generating block 30, outputting the accumulated value to the subtracter 19.

The subtracter 19 subtracts the Rx interval accumulated value (hereafter also referred to as $\Sigma(Rx(i+1)-Rx(i))$) of Rx intervals inputted from the Rx interval accumulating counter 22 from the accumulated value (hereafter also referred to as $\Sigma(Tx(i+1)-Tx(i))$) of Tx intervals inputted from the Tx interval accumulating counter 17 and outputs a difference therebetween $\Delta T(=\Sigma(Tx(i+1)-Tx(i))-\Sigma(Rx(i+1)-Rx(i)))$ to an LPF 23.

The LPF 23 smoothes the difference $\Delta T$ that is sequentially outputted from the subtracter 19 at intervals of sampling period signal generation and outputs the smoothed difference to the DIV (divider) 24.

The DIV (divider) 24 divides difference $T\Delta$ inputted from the LPF 23 by the number of Tx intervals inputted from the Tx interval counter 18 to obtain adjusted packet count C and outputs the obtained adjusted packet count C to the adjusting block 25.

On the basis of the adjusted packet count C inputted from the DIV 24, the adjusting block 25 obtains adjusted packet number S to be adjusted and adds the time of clock count corresponding to the value of summing factor A to time stamp Tx or subtracts the time therefrom for each TS packet subsequent to the TS packet corresponding to the obtained adjusted packet number S. Thus, the time is shifted to adjust the deviation between the reception times of time stamp Tx and TS packet. Then, the adjusting block 25 outputs the result to a read signal generating block 26 and resets the Tx interval accumulating counter 17, the Rx interval accumulating counter 22, and the Tx interval counter 18 when summing factor A is incremented by 1 or decremented by 1. If the adjustment has been made on the basis of adjusted packet number S, the adjusting block 25 updates the adjusted value as adjustment completed packet number T and adds new adjusted packet count C to this adjustment completed number T. Thus, the adjusting block 25 obtains new adjusted packet number S. It should be noted that summing factor A, adjusted packet number S, and adjustment completed packet number are stored in a memory 25a of the adjusting block 25. The method of time stamp Tx adjustment will be detailed later.

On the basis of the time information of time stamp Tx inputted from the adjusting block 25, the read signal generating block 26 generates the read signal of the corresponding TS packet at the corresponding time and outputs the generated read signal to the buffer 27. The buffer 27 temporarily stores the TS packets inputted from the switch 13 and reads the corresponding TS packet when the read signal is inputted from the read signal generating block 26. Then, the buffer 27 outputs the TS packet to a decoding block 28. On the basis of the TS packet inputted from the buffer 27, the decoding block 28 decodes the TS by a predetermined method, such as MPEG2 for example, and displays the decoded TS on a display block 29.

The sampling period signal generating block 30 outputs, at a predetermined sampling period, timing signals for reading values from the Tx interval counter 18, the Tx interval accumulating counter 17, and the Rx interval accumulating counter 22 at predetermined time intervals. It should be noted that this sampling period may be substantially the same as the timing in which an enable signal is inputted, so that this sampling period may be substituted by an enable signal.

The following describes the adjustment of time stamp Tx.

Figure 2:
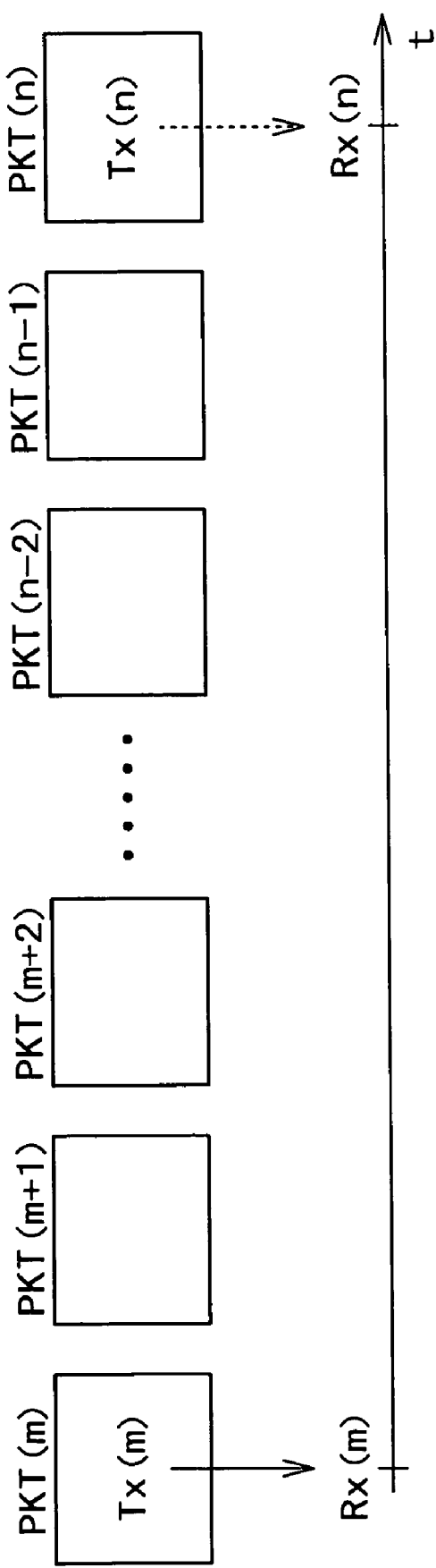
FIG. 2 is a schematic diagram illustrating a Tx interval and an Rx interval of a TS packet.

As shown in FIG. 2, it is assumed here that TS packets PKT(m), PKT(m+1), PKT(m+2) ... PKT(n−2), PKT(n−1), PKT(n) be consecutively present. It should be noted that the time stamp (the time at which reproduction is specified) of packet PKT(m) is indicated by Tx(m) and the time stamp of packet PKT(n) is indicated by Tx(n).

Ideally, the relationship between time Rx(m) at which packet PKT(m) is received and time Rx(n) at which packet PKT(n) is received should be Tx(m)−Tx(n)=Rx(m)−Rx(n).

Figure 3:
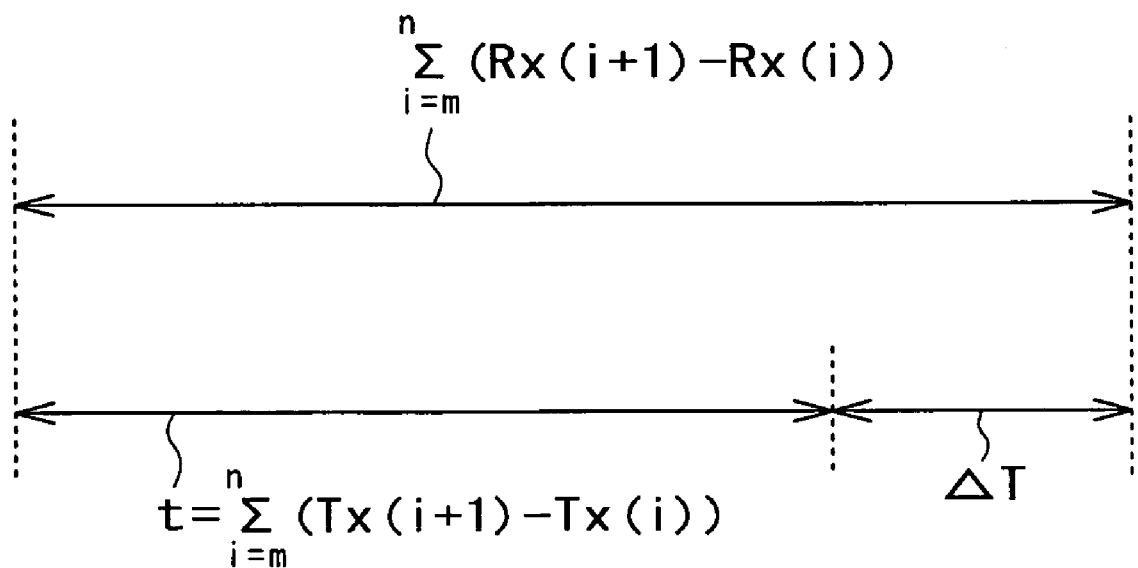
FIG. 3 is a schematic diagram illustrating another Tx interval and another Rx interval of a TS packet.

Actually, however, the above-mentioned various reasons may cause a deviation on the TS packets received by a network communication, such as the Internet. In this case, the timing relationship is as shown in FIG. 3, for example. A substantial error indicated by ΔT occurs between accumulated value $\Sigma(Rx(i+1)-Rx(i))$ (i=m to n−1, holding the same with the following) of Rx intervals of reception time Rx of each TS packet shown in the upper portion and accumulated value $\Sigma(Tx(i+1)-Tx(i))$ (=t) (i=m to n−1, holding the same with the following) of time stamp Tx of each TS packet.

For example, from the relationship shown in FIG. 3, an error per unit time (an error in unit of one clock) is expressed in ΔT/t. Therefore, an error per TS packet CLK(1PKT) has a relationship shown in equation (1) below:

$$CLK_{(1PKT)} = \frac{\Delta T}{t} \times (Tx(i+1) - Tx(i)) \qquad (1)$$

Figure 4:
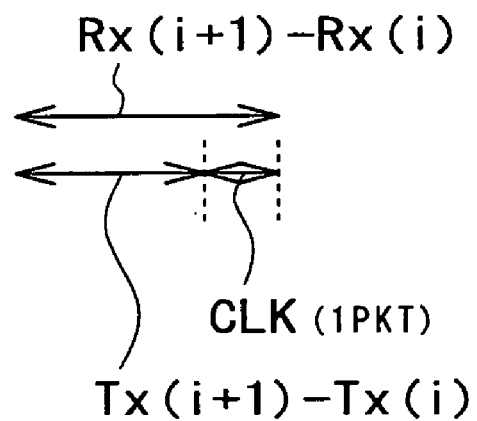
FIG. 4 is a schematic diagram illustrating still another Tx interval and still another Rx interval of TS packet.

Consequently, as shown in FIG. 4, the adjustment of the time providing an error CLK(1PKT) obtainable by actual equation (1) from reception time interval Rx(i) for each TS packet allows the correction of the time stamp to correct time stamp Tx.

However, in the hardware processing, any processing that is shorter than the clock width, which is the minimum unit of time, cannot be executed. Hence, if a decimal fraction occurs as a result of the processing of equation (1), namely, if the error is indivisible, time stamp Tx cannot be adjusted by use of equation (1) as shown in FIG. 4 for each TS packet.

Therefore, the number of TS packets on which an error equivalent to one clock occurs is obtained as adjusted packet count C and a time equivalent to one clock is added or subtracted for each adjusted packet count C, thereby adjusting time stamp Tx.

Adjusted packet count C is the inverse number of error CLK(1PKT) as shown in equation (2) below:

$$C = \frac{1}{\frac{\Delta T}{t} \times (Tx(i+1) - Tx(i))} = \left(\frac{1}{CLK_{(1PKT)}}\right) \qquad (2)$$

$$= \frac{1}{\left(\frac{\sum_{i=m}^{n-1}(Tx(i+1)-Tx(i)) - \sum_{i=m}^{n-1}(Rx(i+1)-Rx(i))}{N_{-PKT} \times (Tx(i+1)-Tx(i))}\right) \times (Tx(i+1)-Tx(i))} \qquad (3)$$

$$= \frac{N_{-PKT}}{\sum_{i=m}^{n-1}(Tx(i+1)-Tx(i)) - \sum_{i=m}^{n-1}(Rx(i+1)-Rx(i))} \qquad (4)$$

Equation (2) can be deformed into equation (3), where N-PKT denotes the number of packets provided when Tx interval to be accumulated reaches time t shown in FIG. 3. Further, when Tx interval (Tx(i+1)−Tx(i)) of equation (3) is canceled, a relationship as shown in equation (4) is obtained.

As shown in equation (4), adjusted packet count C is obtained by dividing packet count N-PKT by a value obtained by subtracting Rx interval accumulated value from Tx interval accumulated value, namely, by difference ΔT.

Figure 5:
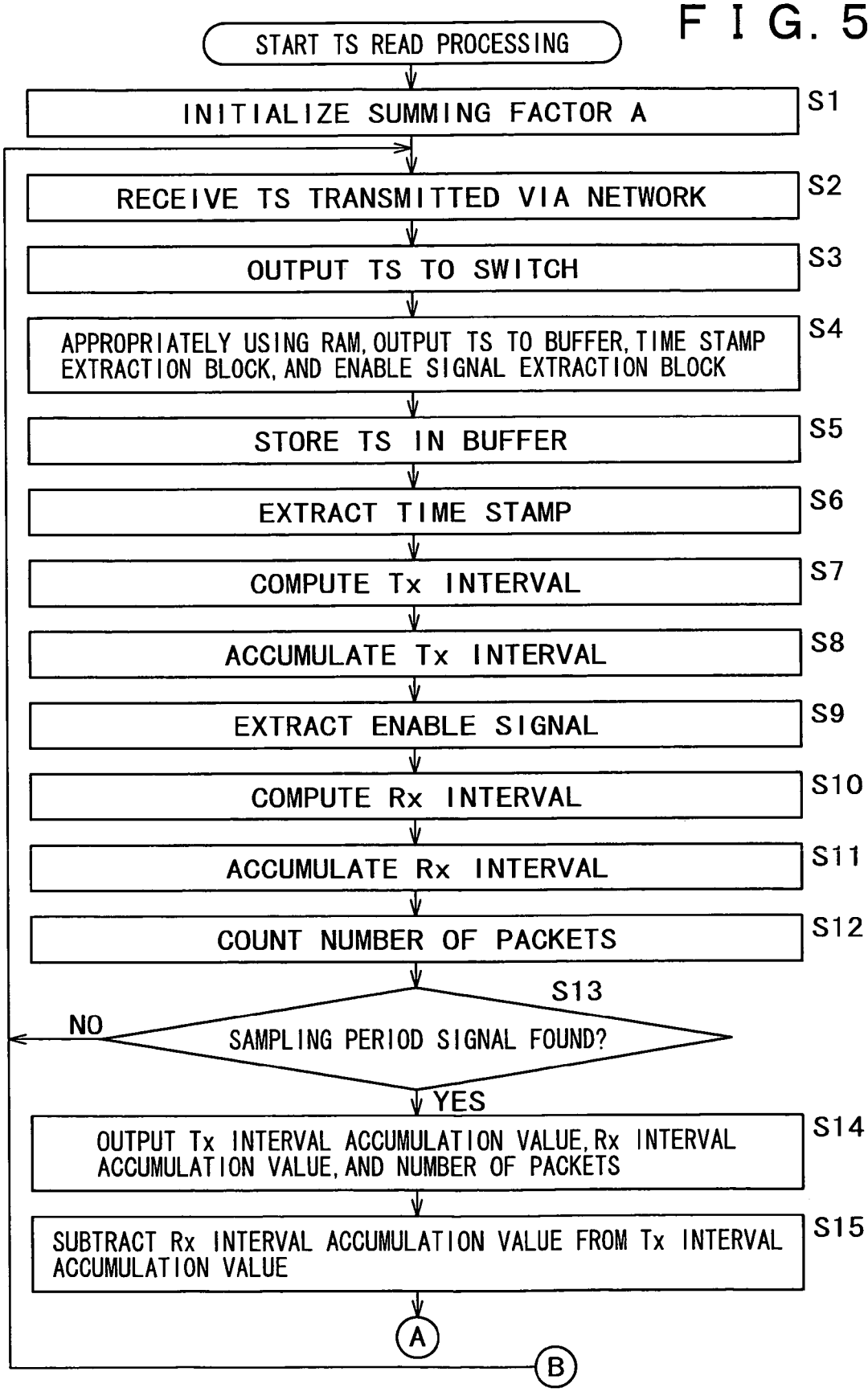
FIG. 5 is a flowchart indicative of TS display processing.
Figure 6:
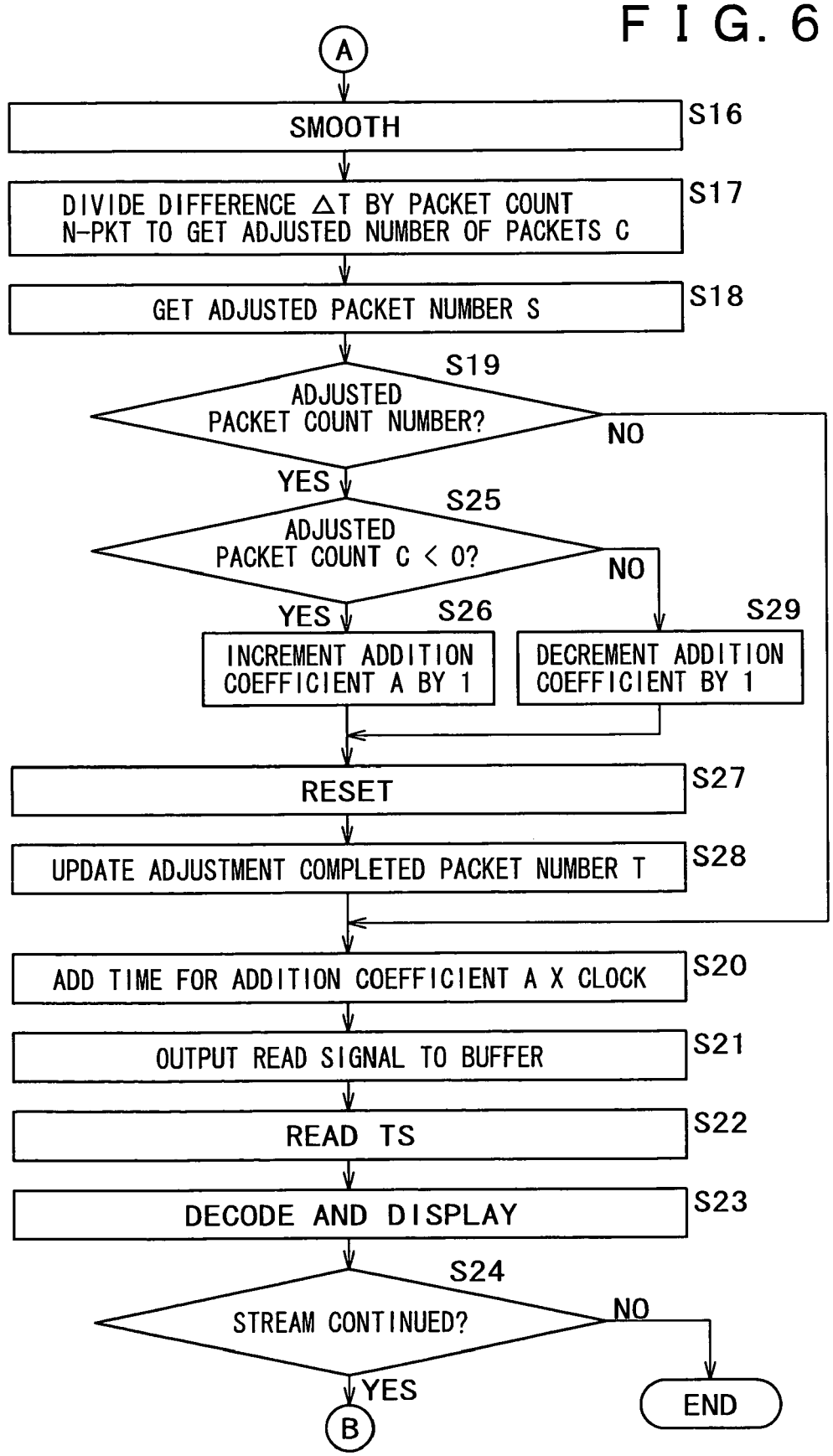
FIG. 6 is another flowchart indicative of TS display processing.

The following describes the image display processing to be executed by the image display device shown in FIG. 1 with reference to the flowcharts shown in FIGS. 5 and 6.

In step S1, the adjusting block 25 initializes summing factor A of the memory 25a to 0. At this moment, the Tx interval counter 18, the Tx interval accumulating counter 17, and the Rx interval accumulating counter 22 are also initialized to 0s. Adjusted packet number S and adjustment completed packet number T are initialized to 1s.

In step S2, the I/F 11 sequentially receives TS packets from the network 1 and outputs the received TS packets to the DMA 12. In step S3, the DMA 12 outputs the inputted TS packets to the switch 13. In step S4, the DMA 12 controls the switch to output the TS packets to the buffer 27, the time stamp extracting block 15, and the enable signal extracting block 20 by appropriately using the RAM 14.

In step S5, the buffer 27 sequentially stores the TS packets inputted through the switch 13. In step S6, the time stamp extracting block 15 extracts the time stamps Tx from the TS packets and outputs the extracted time stamps to the Tx interval computing block 16 and the adjusting block 25.

In step S7, the Tx interval computing block 16 computes Tx interval from the inputted time stamps Tx and outputs the computed Tx interval to the Tx interval accumulating counter 17 and the Tx interval counter 18. If time stamps Tx of TS packets (1) through (12) are time stamp time Tx(1) through Tx(12) as shown in the upper portion of FIG. 7 for example (it should be noted that the number enclosed by parentheses denotes a packet number), Tx interval between packet (1) and packet (2) is computed as Tx(2)−Tx(1), Tx interval between packet (2) and packet (3) is computed as Tx(3)−Tx(2), and so on. It should be noted that the upper portion of FIG. 7 shows a relationship between time stamp Tx and Tx interval, and the lower portion of FIG. 7 shows a relationship between TS packet reception time Rx and Rx interval, where the number enclosed by parentheses denotes a TS packet number, which holds the same with the following.

In step S8, the Tx interval accumulating counter 17 accumulates the inputted Tx intervals and stores them. If packet (2) is inputted for example, the Tx interval accumulating counter 17 stores Tx interval (Tx(2)−Tx(1)). If packet (3) is inputted, Tx interval (Tx(3)−Tx(2)) is inputted and it is added to the value already stored. Accordingly, the Tx interval accumulating counter 17 consequently stores Tx interval (Tx(2)−Tx(1))+(Tx(3)−Tx(2)).

In step S9, the enable signal extracting block 20 extracts an enable signal from each TS packet, obtains reception time Rx of the TS packet from the extracted enable signal, and outputs the obtained time to the Rx interval computing block 21. In step S10, the Rx interval computing block 21 obtains Rx interval from the difference between times Rx at which TS packets were received.

As shown in the lower portion of FIG. 7, if the times at which TS packets (1) through (9) were received are expressed in Rx(1) through Rx(9), then, in the case of the reception of TS packet (2), Rx interval between time Rx(2) at which TS packet (2) was received and time Rx(1) at which TS packet (1) was received is obtained as (Rx(2)−Rx(1)), which is outputted to the Rx interval accumulating counter 22.

If an enable signal is detected with packet (3) in the lower portion of FIG. 7 at the next timing, difference (Rx(3)−Rx(2)) between time Rx(2) at which packet (2) was received and time Rx(3) at which packet (3) was received is obtained as Rx interval, which is outputted to the Rx interval accumulating counter 22. The same operation continues until the last packet. It should be noted that the enable signal is actually outputted every time a predetermined number of plural TS packets are received.

In step S11, the Rx interval accumulating counter 22 accumulates the inputted Rx intervals and stores them. If packet (2) has been received as described above, the Rx interval accumulating counter 22 stores only inputted Rx interval (Rx(2)−Rx(1)). Likewise, when packet (3) is received next, difference (Rx(3)−Rx(2)) is accumulated to store (Rx(2)−Rx(1))+(Rx(3)−Rx(2)). The same operation continues until the last packet.

In step S12, the Tx interval counter 18 counts and stores the number of Tx intervals inputted from the Tx interval computing block 16.

In step S13, the sampling period signal generating block 30 outputs a sampling period signal and it is determined whether this sampling period signal has been inputted in the Tx interval counter 18, the Tx interval accumulating counter 17, and the Rx interval accumulating counter 22. If the sampling period signal is found not inputted, then the procedure returns to step S1 to repeat the above-mentioned processing of step S2 through step S13 until the sampling period signal is found inputted.

If the sampling period signal is found inputted in step S13, then, in step S14, the Tx interval accumulating counter 17 outputs accumulated value Σ(Tx(i+1)−Tx(i)) of Tx intervals to the subtracter 19, the Rx interval accumulating counter 22 outputs accumulated value Σ(Rx(i+1)−Rx(i)) of Rx intervals to the subtracter 19, and the Tx interval counter 18 outputs the number of counted and stored Tx intervals to the DIV 24.

In the case of FIG. 7 for example, if a sampling period signal is inputted when every other TS packet is received, or if a sampling period signal is inputted when TS packet 2 is received first for example, the Tx interval accumulating counter 17 stores difference (Tx interval) between time stamp Tx(2) and time stamp Tx(1) of packet (1) and packet (2). Therefore, Σ(Tx(i+1)−Tx(i))=(Tx(2)−Tx(1)) is outputted from the Tx interval accumulating counter 17. Further, difference (Rx interval) between reception time Rx(1) and Rx(2) of packet (1) and packet (2) is added to the Rx interval accumulating counter 22, so that Σ(Rx(i+1)−Rx(i))=(Rx(2)−Rx(1)) is outputted from the Rx interval accumulating counter 22.

If a sampling period signal is received when TS packet (4) is received, then differences (Tx intervals) between time stamps Tx(1) through Tx(4) of packet (1) through packet (4) are added to the Tx interval accumulating counter 17, so that Σ(Tx(i+1)−Tx(i))=(Tx(2)−Tx(1))+(Tx(3)−Tx(2)+(Tx(4)−Tx(3))=(Tx(4)−Tx(1)) is outputted to the subtracter 19. Likewise, differences (Rx intervals) between reception times of packets (1) through (4) are added to the Rx interval accumulating counter 22, so that Σ(Rx(i+1)−Rx(i))=(Rx(2)−Rx(1))+(Rx(3)−Rx(2)+(Rx(4)−Rx(3))=(Rx(4)−Rx(1)) is outputted from the Rx interval accumulating counter 22.

In step S15, subtracter 19 subtracts Rx interval accumulated value Σ(Rx(i+1)−Rx(i)) from Tx interval accumulated value Σ(Tx(i+1)−(Tx(i)) to obtain difference ΔT(=Σ(Tx(i+1)−(Tx(i))−Σ(Rx(i+1)−Rx(i)) and outputs it to the LPF 23.

In the case of FIG. 7 for example, when TS packet (2) is received, Σ(Rx(i+1)−Rx(i)=(Rx(2)−Rx(1)) is subtracted from Σ(Tx(i+1)−Tx(i))=(Tx(2)−Tx(1)) outputted from the Tx interval accumulating counter 17, thereby outputting difference ΔT (or the number of ΔT clocks). It should be noted that, for the brevity of description, it is assumed that, in the upper portion of FIG. 7, one Tx interval be equivalent to one clock and Tx interval times four be equivalent to Rx interval times three. In this case, difference ΔT becomes ΔT=Σ(Tx(i+1)−Tx(i)−Σ(Rx(i+1)−Rx(i))=(Tx(2)−Tx(1))−(Rx(2)−Rx(1))=1−4/3=−1/3 (clock).

Likewise, if a sampling period signal is received when TS packet (4) is received, difference ΔT becomes ΔT=(Tx(4)−Tx(1))−(Rx(4)−Rx(1))=3−4=−1 (clock). The subsequent differences can be obtained in the same manner.

In step S16 (FIG. 6), the LPF 23 smoothes inputted difference ΔT and outputs it to DIV 24. Actual Rx intervals are not constant as shown in the lower portion of FIG. 7, so that difference ΔT is also subject to like variation, requiring smoothing. Consequently, if variation occurs between Rx intervals, a stable value of difference ΔT can be set.

In step S17, the DIV 24 executes computation indicated by equation (4) by dividing the number of Tx intervals N-PKT inputted from the Tx interval counter 18 by difference ΔT smoothed by the LPF 23 to obtain adjusted packet count C and outputs it to the adjusting block 25.

In the case of FIG. 7 as described above, when packet (2) is inputted, difference ΔT becomes −1/3 clock and adjusted packet count C becomes C=1/(−1/3)=−3 because the number of Tx intervals is 1 between packets (1) and (2).

Likewise, when packet (4) is inputted, difference ΔT becomes one (clock) and the number of Tx intervals is 3, namely, between packets (1) and (2), between packets (2) and (3), and between packets (3) and (4), so that adjusted packet count C is C=3/(−1)=−3.

In the case of FIG. 7, the relationship between Tx interval and Rx interval does not change, so that the adjusted packet counts with all timings are the same. Actually, however, Rx intervals change, so that adjusted packet count C may not be constant.

In step S18, the adjusting block 25 obtains adjusted packet number S on the basis of the obtained adjusted packet count C. The adjusting block 25 adds the absolute value of current adjusted packet count C to adjustment completed packet number T that starts adding a time for one clock, obtaining adjusted packet number S to be actually adjusted. For example, in the case of the first processing, no TS packet exists that has been adjusted for adding a time for one clock previously. However, when the processing starts, the adjustment has been made with packet (1), so that S=1 is set as the initial value. Hence, the obtained adjusted packet count C is added to obtain adjusted packet number S=4 (=1+3).

In step S19, the adjusting block 25 determines whether the current TS packet corresponds to the adjusted packet number. In the case of FIG. 7, adjusted packet number S=4. However, it is determined that adjusted packet number S is not 4 when packet (2) shown in the lower portion of FIG. 7 is inputted, upon which the procedure goes to step S20.

In step S20, the adjusting block 25 adds a time for clock count×summing factor A to time stamp Tx supplied from the time stamp extracting block 15 subsequent to this timing. In this example, summing factor is 0, so that, substantially, time stamp Tx is outputted to the read signal generating block 26 without adjustment. The determination that adjusted packet number is not 4 in step S19 indicates that the deviation of time Rx at which time stamp Tx and TS packet were received is less than one clock, so that the adjustment of time stamp Tx is not executed.

In step S21, read signal generating block 26 outputs a read signal to the buffer 27 with the timing of the inputted time stamp Tx. In step S22, the buffer 27 outputs the corresponding TS packet to the decoding block 28 when the read signal is inputted.

In step S23, the decoding block 28 decodes the read TS packet and displays the decoded TS packet onto the display block 29.

In step S24, it is determined whether the transport stream still continues. If the transport stream is found still continuing, then the procedure returns to step S2; otherwise, this processing ends.

In the case of FIG. 7, adjusted packet number S=4; if packet (4) for example in the lower portion of FIG. 7 is inputted, inputted packet (4) is determined in step S19 to be the TS packet corresponding to adjusted packet number S=4, upon which the procedure goes to step S25.

In step S25, the adjusting block 25 determines whether or not adjusted packet count C is a negative value. For example, in the case of FIG. 7, adjusted packet count C is −3, so that adjusted packet count C is found to be a negative value, upon which the procedure goes to step S26.

In step S26, the adjusting block 25 increments summing factor A stored in the memory 25a by 1. In this example, the summing factor is incremented to 1, so that, in the subsequent processing, a time for one clock is added to time stamp Tx obtained from the time stamp extracting block 15 and the resultant time stamp is outputted to the read signal generating block 26.

In step S27, the adjusting block 25 resets the Tx interval accumulating counter 17, the Rx interval accumulating counter 22, and the Tx interval counter 18.

In step S28, adjustment completed packet number T is updated to adjusted packet number S. In this example, adjustment completed packet number T is updated from 1 to 4, which is the value of adjusted packet number S.

Figure 8:
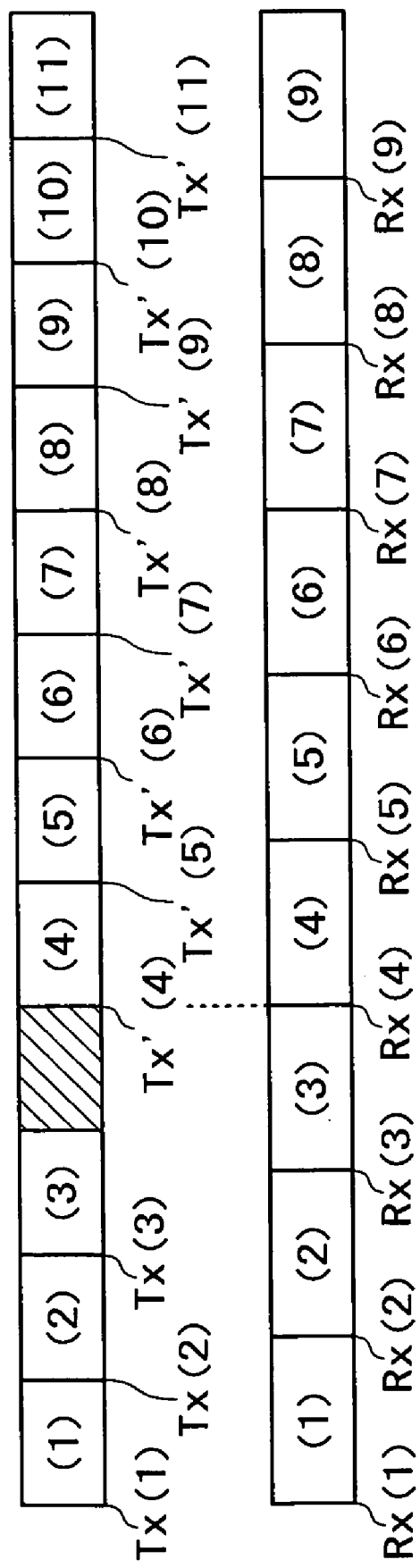
FIG. 8 is a schematic diagram illustrating another process of adjusting Tx interval of a TS packet.

Adjusted packet count C indicates the number of Tx intervals when difference ΔT between the accumulated value of the times of received TS packets and the accumulated value of time stamps Tx of the TS packets is equivalent to one clock. Therefore, when the number of Tx intervals becomes three, the difference (or deviation) from received Tx interval becomes one clock (in the case of FIG. 7, one clock is equal to 1 Tx interval). Therefore, when the TS packets corresponding to adjusted packet count C are counted, a time of clock count corresponding to summing factor A is added to all values of subsequent time stamps Tx, thereby correcting the deviation from the reception time, as shown in the upper portion of FIG. 8. In the upper portion of FIG. 8, time stamp Tx'(4) through time stamp Tx(10) become the time with a time for one clock added to each of time stamp Tx(4) through time stamp Tx(10).

If, after updating to adjustment completed packet number T=4, no change is caused in adjusted packet count C by the above-mentioned processing, adding absolute value 3 of adjusted packet count C to adjustment completed packet number T=4 in step S18 provides adjusted packet number S=7 when TS packets subsequent to TS packet (4) are received. When TS packets (5) and (6) are received in this state, the TS packet of adjusted packet number S is not received in step S19, so that the procedure goes to step S20.

Figure 9:
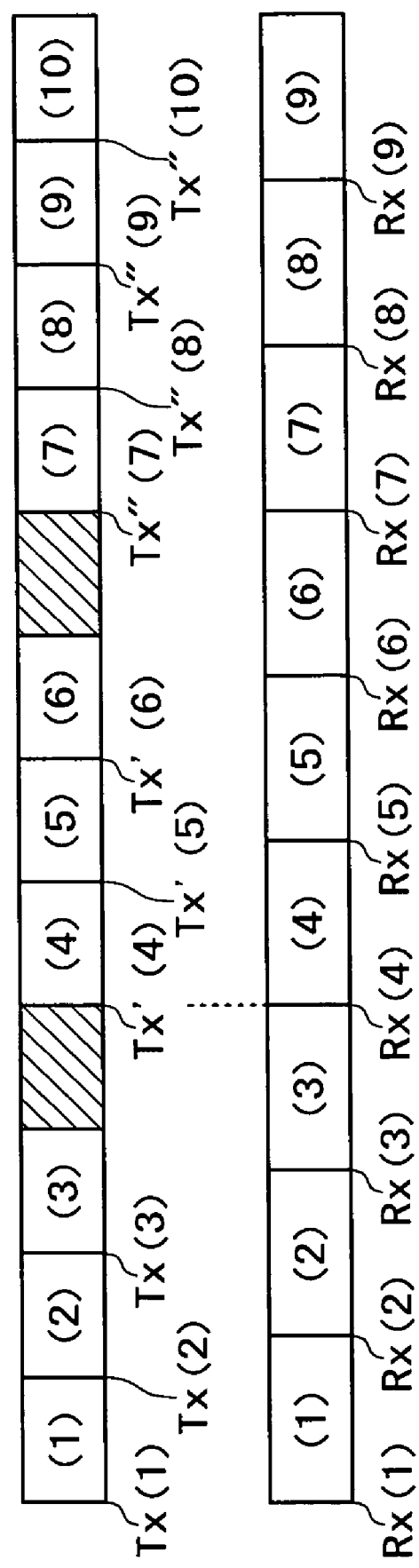
FIG. 9 is a schematic diagram illustrating still another process of adjusting Tx interval of a TS packet.

Further, when TS packet (7) is received, the difference from time stamp Tx is equivalent to one clock and the packet having adjusted packet number S=7 is received. When the processes of steps S25 and S26 are executed, summing factor A is further incremented by 1 to 2. Consequently, time stamps Tx'(8) through Tx'(10) of subsequent to TS packets (8) are changed to time stamps Tx"(8) through Tx"(10) as shown in FIG. 9. Time stamps Tx"(8) through Tx"(10) are corrected by making adjustment by adding a time equivalent to summing factor A=2×clock to original time stamps Tx(8) through Tx(10).

If adjusted packet count C is found to be not negative, namely, it is found to be higher than 0, in step S25, then the adjusting block 25 decrement summing factor A stored in the memory 25a by 1 in step S29.

Figure 10:
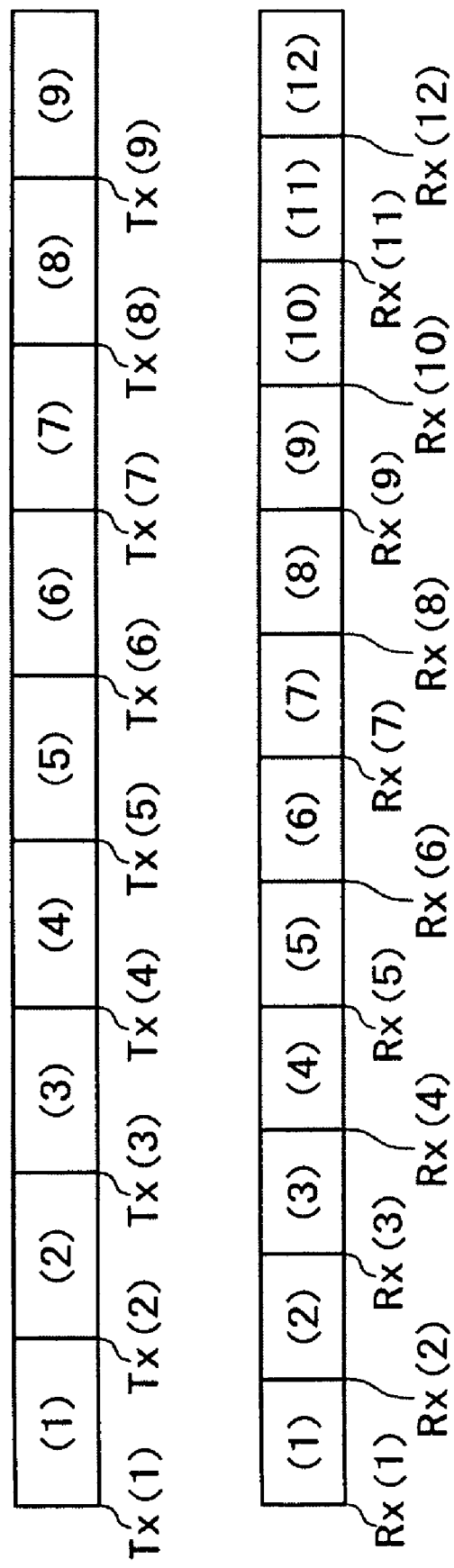
FIG. 10 is a schematic diagram illustrating yet another process of adjusting Tx interval of a TS packet.

To be more specific, if one Tx interval is equivalent to one clock and three Tx intervals are equivalent to four Rx intervals for example as shown in FIG. 10 and if a sampling period signal is received when packet (5) is received, adjusted packet count C becomes C=3/(3−9/4)=4 due to the process of step S17. Therefore, in the first processing, adjusted packet number S becomes 1(=previous adjusted packet number T)+4 (=adjusted packet count C)=5 due to the process of step S18. When TS packet (5) is inputted, then it is determined to be an adjusted packet number in step S19. In step S20, adjusted packet count C is determined to be positive, upon which the procedure goes to step S29.

In step S29, when summing factor A is decremented by 1, a time equivalent to one clock is subtracted from time stamp Tx of TS packet by the process of step S20. As shown in the upper portion of FIG. 11, when count has reached from TS packet (1) to TS packet (4), time stamp Tx(5) of next TS packet (5) becomes Tx'(5) obtained by subtracting summing factor A(=1)×clock count. In the case of the upper portion of FIG. 11, one Tx interval is one clock, so that time stamp Tx(4) of TS packet (4) is substantially the same as time stamp Tx'(5) of TS packet (5), only TS packet to be reproduced later will be reproduced.

Figure 11:
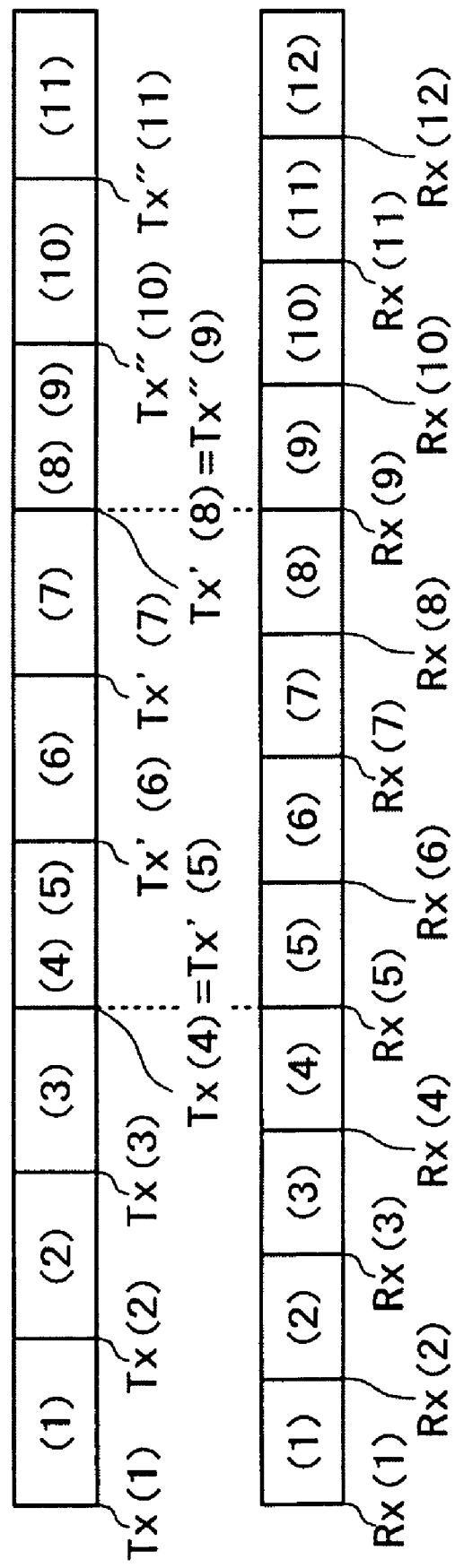
FIG. 11 is a schematic diagram illustrating another process of adjusting Tx interval of a TS packet.

If there is no change in adjusted packet count C, adjustment completed packet number T is updated to five by the first processing. When packet (9) is inputted as shown in FIG. 11, adjusted packet number S becomes 5(=adjustment completed packet number T)+4(=adjusted packet count C)=9 by the process of step S18. Consequently, summing factor A is further decremented by 1 when packet (9) is inputted, thereby subtracting a time for summing factor A (=(−2))×clock from time stamp Tx(9) to provide time stamp Tx"(9). AT this moment, substantially the same time as time stamp Tx'(8) of TS packet (8) is obtained.

Actually, however, Tx interval is always a plurality of clocks; therefore the TS packet before correction will not disappear and the correction for one clock is executed as shown in the upper portion of FIG. 11.

Consequently, by this processing, the difference between the actual reception timing and time stamp is maintained less than one clock at a maximum, thereby enabling to remove jitter and reproduce stream data with the same clock accuracy as used on the sender device.

In the above-mentioned processing, stream data is sequentially adjusted in reproduction timing before being stored in the buffer, rather than temporarily storing stream data before executing reproduction time adjustment. Thus, the time for storing stream data in the buffer is reduced, which in turn reduces the delay of the whole system.

The above description has been made by use of the TS of MPEG for example; it will be apparent that the present invention is also applicable to the realtime distribution of stream data having a function equivalent to time stamp.

It will be also apparent that the present invention is applicable not only to IP-based networks but also to other networks.

The above-mentioned sequence of processing operations may be executed by software as well as hardware. When the above-mentioned sequence of processing operations is executed by software, the programs constituting the software are installed in a computer, which is built in dedicated hardware equipment, or installed, from recording media, into a general-purpose personal computer for example in which various programs may be installed for the execution of various functions.

FIG. 12 shows a configuration of a personal computer practiced as one embodiment of the invention when the image display device 2 is realized by software. A CPU 101 of this personal computer controls the entire operation of the personal computer. When a command is inputted from an input block 106 composed of a keyboard or a mouse via a bus 104 or an input/output interface 105, the CPU 101 correspondingly executes a program stored in a ROM (Read Only Memory) 102. Alternatively, the CPU 101 loads a program read from a magnetic disk 111, an optical disk 112, a magneto-optical disk 113, or a semiconductor memory-114 and installed in a storage block 108 into a RAM (Random Access Memory) 103. The CPU 101 executes the loaded program. The disks 111 to 113 and the memory 114 are connected to a drive 110. This realizes the above-mentioned function of the image processing device by means of software. Further, the CPU 101 controls a communication block 109 to make communication with the outside, thereby executing data transmission/reception processing.

As shown in FIG. 12, not only a program recorded package media distributed separately from the apparatus itself to provide the program to the user, but also a hard disk constitutes these recording media. The package media are made up of, for example, the magnetic disk 111 (including flexible disks), the optical disk 112 (including CD-ROM [Compact Disc-Read Only Memory] and DVD [Digital Versatile Disc]), the magneto-optical disk 113 (including MD [Mini Disc]), or the semiconductor memory 114. The hard disk is included in the ROM 102 or the storage unit 108, which stores programs and is provided to users as incorporated in the apparatus itself.

It should be noted herein that the steps for describing each program recorded in recording media include not only the processing operations sequentially executed in a time-dependent manner but also the processing operations executed concurrently or discretely.

INDUSTRIAL APPLICABILITY

As described and according to the invention, jitter can be removed and stream data can be reproduced with the clock accuracy of the sender side. In addition, the time for storing stream data in the buffer can be reduced, thereby reducing the delay of the whole system.

The invention claimed is:

1. An information processing device comprising:
   first extraction means for extracting, utilizing an extraction circuit, a reproduction time from stream data;
   second extraction means for extracting, utilizing an extraction circuit, an actual reception time of said stream data;
   computation means for computing, utilizing a computation circuit, a difference between said reception time and said reproduction time; and
   adjustment means for adjusting, utilizing an adjusting circuit, a reproduction time by:
   calculating a number equal to a number of packets of stream data for the difference, wherein the difference between said reception time and said reproduction time is a time equivalent to one clock cycle; and
   utilizing the number to maintain less than one clock cycle maximum between an actual reception time and the reproduction time.

2. An information processing device comprising:
   first extraction means for extracting, utilizing an extraction circuit, an interval of reproduction time between packets of stream data;
   second extraction means for extracting, utilizing an extraction circuit, an interval of actual reception time between packets of said stream data;
   computation means for computing, utilizing a computation circuit, a difference between said interval of reproduction time and said interval of reception time; and
   adjustment means for adjusting, utilizing an adjusting circuit a reproduction time by:
   calculating a number equal to a number of packets of stream data for the difference, wherein the difference between said reception time and said reproduction time is a time equivalent to one clock cycle; and
   utilizing the number to maintain less than one clock cycle maximum between an actual reception time and the reproduction time.

3. The information processing device according to claim 2, wherein said reproduction time is a time stamp.

4. The information processing device according to claim 2, further comprising:
   first accumulation means for accumulating, utilizing an accumulation circuit, intervals of reproduction time between a predetermined number of consecutive packets of said stream data to obtain a first time; and
   second accumulation means for accumulating intervals, utilizing an accumulation circuit, of reception time between said predetermined number of consecutive packets of said stream data to obtain a second time;
   wherein said computation means computes a difference between said first time and said second time.

5. The information processing device according to claim 4, further comprising:
   smoothing means for smoothing said difference between said first time and said second time.

6. The information processing device according to claim 5, wherein said adjustment means adjusts reproduction time information by adding a time equivalent to one clock to said reproduction time or subtracting said time from said reproduction time for each number of packets with which said difference between said first time and said second time smoothed by said smoothing means provides a deviation equivalent to one clock.

7. An information processing method, stored in a memory and executed by a processor, the method comprising the steps of:
  extracting a reproduction time from stream data;
  extracting an actual reception time of said stream data;
  computing a difference between said reception time and said reproduction time; and
  adjusting a reproduction time by:
    calculating a number equal to a number of packets of stream data for the difference, wherein the difference between said reception time and said reproduction time is a time equivalent to one clock cycle; and
    utilizing the number to maintain less than one clock cycle maximum between an actual reception time and the reproduction time.

8. An information processing method, stored in a memory and executed by a processor, the method comprising the steps of:
  extracting an interval of reproduction time between packets of stream data;
  extracting an interval of actual reception time between packets of said stream data;
  computing a difference between said interval of reproduction time and said interval of reception time; and
  adjusting a reproduction time by:
    calculating a number equal to a number of packets of stream data for the difference, wherein the difference between said reception time and said reproduction time is a time equivalent to one clock cycle; and
    utilizing the number to maintain less than one clock cycle maximum between an actual reception time and the reproduction time.

9. The information processing method according to claim 8, wherein said reproduction time is a time stamp.

10. The information processing method according to claim 8, further comprising the steps of:
  accumulating intervals of reproduction time between a predetermined number of consecutive packets of said stream data to obtain a first time; and
  accumulating intervals of reception time between said predetermined number of consecutive packets of said stream data to obtain a second time;
  wherein said computation step computes a difference between said first time and said second time.

11. The information processing method according to claim 10, further comprising the step of:
  smoothing said difference between said first time and said second time.

12. The information processing method according to claim 11,
  wherein said adjustment step adjusts reproduction time information by adding a time equivalent to one clock to said reproduction time or subtracting said time from said reproduction time for each number of packets with which said difference between said first time and said second time smoothed by said smoothing step provides a deviation equivalent to one clock.

13. A computer-readable medium storing a computer program, the program, stored in a memory and executed by a processor, the program, comprising the steps of:
  extracting a reproduction time from stream data;
  extracting an actual reception time of said stream data;
  computing a difference between said reception time and said reproduction time; and
  adjusting a reproduction time by:
    calculating a number equal to a number of packets of stream data for the difference, wherein the difference between said reception time and said reproduction time is a time equivalent to one clock cycle; and
    utilizing the number to maintain less than one clock cycle maximum between an actual reception time and the reproduction time.

14. A computer-readable medium storing a computer program, the program executed by an associated processing apparatus, the program comprising the steps of:
  extracting an interval of reproduction time between packets of stream data;
  extracting an interval of actual reception time between packets of said stream data;
  computing a difference between said interval of reproduction time and said interval of reception time; and
  adjusting a reproduction time by:
    calculating a number equal to a number of packets of stream data for the difference, wherein the difference between said reception time and said reproduction time is a time equivalent to one clock cycle; and
    utilizing the number to maintain less than one clock cycle maximum between an actual reception time and the reproduction time.

15. The computer program according to claim 14, wherein said reproduction time is a time stamp.

16. The computer program according to claim 14, further comprising the steps of:
  accumulating intervals of reproduction time between a predetermined number of consecutive packets of said stream data to obtain a first time; and
  accumulating intervals of reception time between said predetermined number of consecutive packets of said stream data to obtain a second time;
  wherein said computation step computes a difference between said first time and said second time.

17. The computer program according to claim 16, further comprising the step of:
  smoothing said difference between said first time and said second time.

18. The computer program according to claim 17,
  wherein said adjustment step adjusts reproduction time information by adding a time equivalent to one clock to said reproduction time or subtracting said time from said reproduction time for each number of packets with which said difference between said first time and said second time smoothed by said smoothing step provides a deviation equivalent to one clock.

* * * * *